Patented Aug. 11, 1936

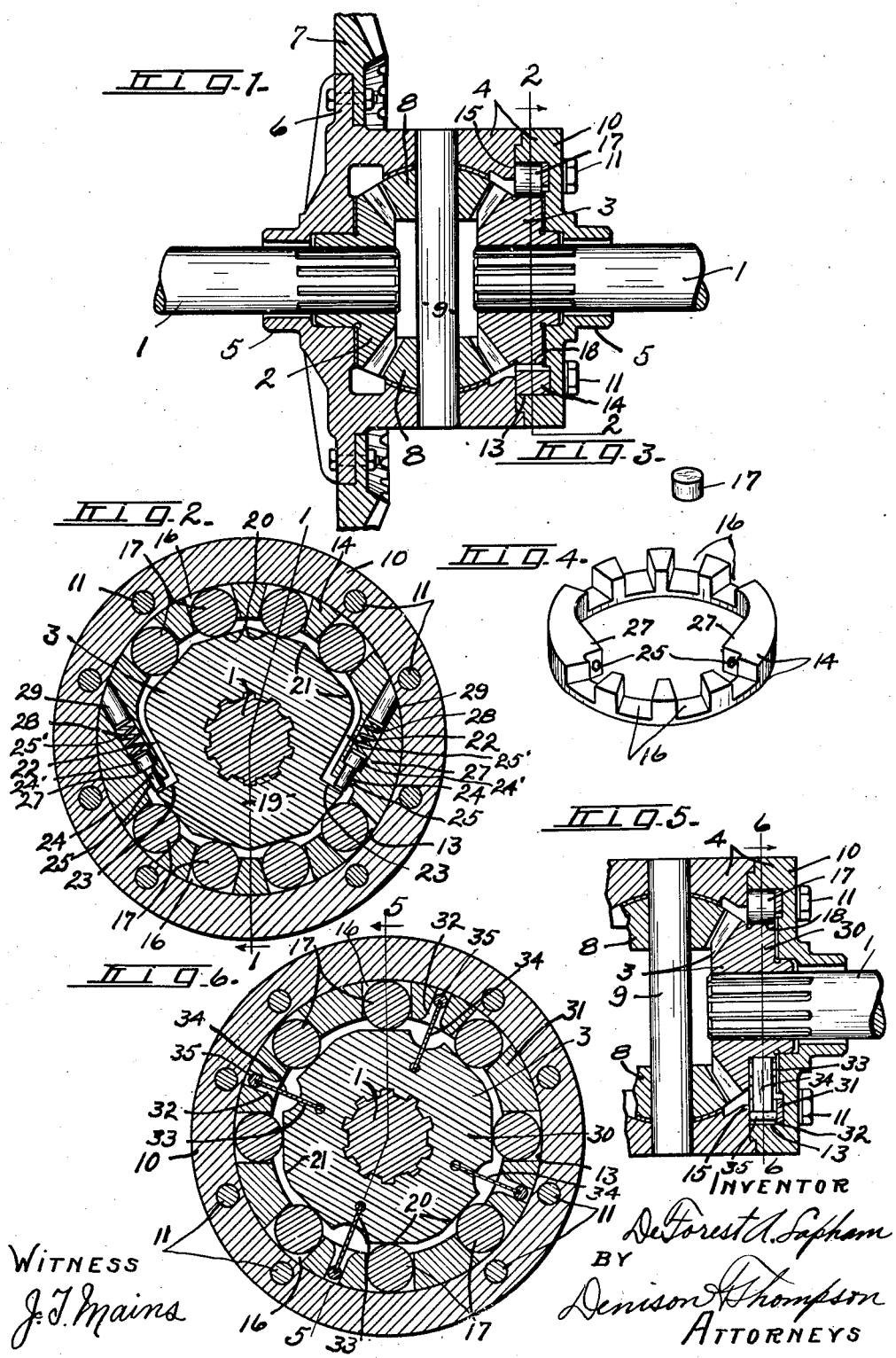

2,050,344

UNITED STATES PATENT OFFICE 2,050,344

DIFFERENTIAL

De Forest A. Lapham, Syracuse, N. Y., assignor to Brace-Lapham Engineering Corporation, Syracuse, N. Y., a corporation of New York Application October 20, 1932, Serial No. 638,761

24 Claims. (Cl. 74—311)

This invention relates to new and useful improvements in differential power transmission mechanism and relates more particularly to an automatic locking type of differential adapted for use in motor-driven vehicles such as automobiles, trucks, tractors or the like.

It is a well-known fact that one of the driving wheels of motor-driven vehicles often meets with less desirable traction conditions than the other wheel, particularly when operating in snow, ice or mud, and that when using the conventional differential gearing, the wheel meeting with the least resistance will receive the entire power of the driving means and will spin while the other driving wheel having the greater degree of traction will receive no power and remain stationary, with the result that the vehicle becomes stalled, whereas if power could be applied to the wheel having the greater amount of traction and be set in motion, the vehicle oftentimes would be moved.

The applicant realizes that automatic locking differential mechanisms have heretofore been constructed for preventing spinning of one of the driving members or wheels, but insofar as he is aware, either these devices have failed to differentiate properly, or the manner of automatically preventing the differential action in extreme conditions has been so inefficient as to render the devices commercially impractical.

The main object of this invention is to produce a differential gearing which will automatically lock the various relatively movable members thereof together to produce positive rotation of both driving members or wheels of the vehicle when the relative movement of the members equals or tends to exceed a predetermined speed and, at the same time, permit the free relative or differential action of the differential units when the relative movement thereof is below the predetermined speed to permit the free differential action of the driving wheels necessary in making sharp turns or in traveling over rough uneven surfaces.

Another object is to produce a positive locking type of differential which will operate equally well in either of two directions so as to be equally effective for driving the vehicle in a rearward as well as in a forward direction.

Further objects and advantages of the invention are to produce a device of the above-mentioned type which is durable, simple and economical in construction and which is positive and dependable in operation.

In carrying out the above-mentioned objects, I have slightly altered a differential gearing unit of the usual or conventional construction and applied thereto a simple and effective automatic clutch mechanism which is adapted to automatically lock two relatively movable portions of the differential together when the relative movement of these portions equals or tends to exceed a predetermined speed.

Other objects and advantages relating to the construction of the device and to the form and relation of the parts thereof will more fully appear from the following description, taken in connection with the accompanying drawing, wherein:—

Figure 1 is a longitudinal central sectional view taken in the plane of the line 1—1, Figure 2, through a differential mechanism embodying the various features of this invention.

Figure 2 is an enlarged transverse sectional view through the clutch mechanism and taken in the plane of the line 2—2, Figure 1.

Figure 3 is a perspective view of one of the locking or clutch rollers.

Figure 4 is a perspective view of the roller-retaining ring.

Figure 5 is a detail central sectional view taken in the plane of the line 5—5, Figure 6, and illustrating a slightly modified form of clutch mechanism.

Figure 6 is an enlarged transverse sectional view taken in the plane of the line 6—6, Figure 5.

As illustrated in the drawing, this device consists of a pair of axially aligned spaced axle shafts 1. One of the shafts 1 has a beveled gear 2 splined or otherwise secured to the end thereof adjacent the other shaft, while the other shaft 1 has a similarly constructed gear 3 secured to the end thereof adjacent the opposite shaft. These beveled gears are journaled in respective sides of a housing 4 which, in turn, is adapted to be rotatably mounted at 5 in the conventional manner in adjacent portions of the usual differential casing, not shown.

The housing 4 carries an outwardly extending annular flange 6 adjacent one end thereof to which is secured a beveled ring gear 7 adapted to have tooth engagement with a suitable pinion gear, not shown, mounted on a drive shaft operably connected with a source of power, also not shown, for revolving said housing in either of two opposite directions.

A pair of beveled pinions 8 are arranged at diametrically opposite sides of the gears 2 and 3 in meshing engagement with the beveled gears and are journaled upon a stub shaft 9 which, in this instance, extends diametrically across the housing 4 and has the ends thereof secured in opposite sides of the housing.

The end 10 of the housing 4 opposite the flange 6 is separate from the remaining or body portion of the housing and is removably secured to the housing by screws 11 or their equivalent, to permit the ready assembling of the gears 2 and 3 and the pinions 8 within the housing or the removal thereof from the housing.

The inner face of the end member 10 is provided with an annular recess 13 arranged concentric with the respective shaft 1 and gear 3. In this recess 13 is rotatably mounted a roller-retaining ring 14 which is maintained in position in the recess by the adjacent side wall of the end member 10 and the end 15 of the body portion of the housing which is made to extend inwardly beyond the outer peripheral edge of the recess.

The roller-retaining ring 14 has one face thereof provided with a plurality of, in this instance eight, radially extending circumferentially spaced slots or recesses 16 adapted to receive a respective roller as 17. The rollers 17 are of greater diameter than the radial thickness of the ring 14 so that the peripheral surface of the roller will extend a relatively short distance inwardly beyond the inner face of the ring, as illustrated in Figure 2, for rolling engagement with the peripheral surface 18 of the gear 3 which is formed by extending a portion of the hub 19 of the gear to form the bearing surface 18 which is of less diameter than the inner opening of the ring 14 for permitting free relative rotary movement of the gear hub and the ring.

The peripheral surface 18 of the gear 3 is formed with a plurality of, in this instance eight, flattened portions or recesses 20 formed at right angles to a radial line passing through the center thereof. These flattened portions are arranged in two groups at diametrically opposite sides of the hub, with the portions 20 of each group arranged in uniform circumferential spaced relation to form cam surfaces 21 at the end of and intermediate said flattened portions. The hub 19 of the gear 3 also has opposite sides thereof intermediate the two pairs of flattened portions 20, provided with tangential recesses 22, with the inner ends thereof terminating within the hub at the same side of the center of the hub to form opposed abutting shoulders 23 against which respective plungers 24 impinge. These plungers 24 are slidably mounted in a respective bore 25 formed in the roller-retaining ring 14.

The slots 16 in the roller-retaining ring are arranged in two pairs of four slots each, with the slots of each pair arranged at diametrically opposite sides of the ring. The ring 14 has the opposite sides thereof intermediate the pairs of slots 16, provided with inwardly extending portions or lugs 27. These lugs are arranged to extend tangentially to the axis of the ring into a respective recess 22, and have the inner ends thereof terminating a relatively short distance from the adjacent shoulder 23 on the hub 19, as clearly illustrated in Figure 2, to permit relative movement of the hub and ring.

The holes or bores 25 extend outwardly from the inner end of the respective lug 27 at right angles to the shoulders 23 and have the outer portions 25' thereof slightly enlarged for receiving the enlarged head ends as 24' of the pins 24. The pins are yieldingly pressed into engagement with the respective shoulder 23 by means of coil spring 28 positioned in the portion 25' of the bore intermediate the head 24' of the respective pin and a retaining plug 29 which is pressed into or otherwise secured in the outer end of the bore portion 25'.

The circumferential spacing of the slots 16 in the ring 14 is substantially equal to that of the flattened portions 20 on the periphery of the hub 19 so that when the ring is maintained in its normal position by the action of the spring-pressed plungers 24, the roller 17 will be maintained in radial alignment with the flattened portions 20 substantially midway between the adjacent cam faces 21 so that when a relative movement of the retaining ring and the gear 3 occurs in either direction, the rollers 17 will be moved accordingly in one direction or the other, into engagement with the cam surface 21 at the corresponding side of the flattened portions 20, and thereby cause the rollers 17 to frictionally secure the housing 4 and the gear 3 together as the rollers 17 engage the cam faces 21 and become wedged between said face and the peripheral wall of the housing recess 13. In other words, the spring plungers 24 function to maintain the rollers 17 normally centralized with the recesses 20, so that the gear 3 and the retaining ring 14, together with the rollers 17, may freely rotate in unison within the recess 13 provided in the housing 4, thereby permitting the free movement of the gear 3 relative to the housing and allow the differential to operate or differentiate freely without any action from the clutch rollers up to a predetermined speed.

When a higher speed of differentiation is obtained, as in the spinning of one of the shafts 1, the inertia of the cam ring 14 and rollers 17, will overcome the action of one or the other of the springs 28, depending upon the direction of rotation and thereby cause a relative movement between the rollers and the gear 3 which will cause the locking of the gear to the housing by the rollers 17 as they engage the respective cam surfaces 21. It will therefore be seen that the clutching action of the rollers 17 is equally effective whether engaging the cam surfaces at one side of the recesses 20 or at the opposite side and, therefore, it is apparent that the clutching action of these members is equally effective whether the housing 4 is rotated in one direction or the other.

It will also be apparent that the speed of the relative movement between the gear 3 and the housing 4 before the clutching action of the rollers takes place, may readily be determined to permit the differential to operate or differentiate freely, as required when traveling over an uneven surface or in turning corners, by providing the springs 28 of greater or less degree of tension so as to require a greater or less relative speed between the housing 4 and the gear 3 before the inertia of the rollers and ring will overcome the action of one or the other of the springs 28 and thereby effect the locking of the gear and housing together in the manner hereinbefore described and thus cause power to be positively applied alike to both axle shafts 1 and the wheels driven thereby.

In Figures 5 and 6 I have illustrated a slightly modified form of clutch mechanism which consists of a slightly different arrangement of the roller ring and spring members for yieldingly maintaining the ring in fixed relation with the gear member 3.

As shown in these views, the gear 3 has the hub as 30 slightly altered so that the flattened portions 20 and cam surfaces 21 are equally spaced circumferentially on the peripheral surface of the hub, and the roller ring as 31 has the slots 16 similarly equally spaced so as to maintain the rollers 17 in substantial central relation with the flat surfaces 20 and, therefore, midway between the adjacent cams 21. Furthermore, the ring 31 instead of having the lug members 27, is provided with a plurality of, in this instance four, radial slots 32 in the side face thereof having the roller slots 16. These slots 32 are arranged in uniform circumferential spaced relation and intermediate adjacent roller slots 16.

Each slot 32 is normally in radial alignment with a companion radial slot 33 which extends inwardly from the peripheral surface of the hub 30 midway between adjacent flattened surfaces 20. In each of the slots 33 is secured one end of a flat spring member 34 which extends outwardly beyond the peripheral surface of the hub 30, and has the other end thereof positioned within the adjacent slot 32 formed in the roller ring 31.

Each of these springs 34 has secured to the outer end thereof an enlarged cylindrical bearing member 35 which is adapted to slidably fit within the respective slot 32. Each of these springs is of sufficient size and tension to maintain the ring 31 and the rollers 17 carried thereby in fixed relation with the hub 30 during relatively slow relative movement of the housing 4 and the gear 3 to permit the required differential action of the shafts 1, and at the same time, these springs are adapted to permit the inertia of the roller ring 31 and rollers 17 when the relative movement of the housing 4 and gear 3 increases beyond a certain predetermined speed to overcome the action of the springs and permit relative movement of the roller ring 31 and the gear 3 for causing the rollers 17 to be moved along the flattened surfaces 20 into engagement with the cam surfaces 21 to lock the gear and housing together in the manner heretofore described for the device shown in Figures 1 and 2.

In other words, the function of the springs 34 is to yieldingly maintain the rollers 17 centralized with the flat surfaces 20 so that when slow differentiation takes place, these spring members will cause the retainer ring to revolve with the gear member 3, causing no locking action between the gear and housing, but as the speed of differentiation increases, the inertia of the retainer ring causes the spring members to flex sufficiently to allow the rollers to move in one direction or the other, depending upon the direction of rotation of the housing into engagement with the respective cam face 21, thereby wedging the rollers 17 between said cam face and the periphery of the recess in the plate 10, thus causing the housing 4, retaining ring 31, rollers 17, gear 3 and shaft 1 to rotate in unison. As soon as both wheels driven by the shafts 1 again obtain equal traction, the locking pressure on the rollers 17 is relieved and the spring members 34 will again return the rollers to their normal relation with the flattened surfaces 20 through the medium of the retaining ring 31 and thereby release the gear from the housing and permit the differential to function in the usual manner.

It is obvious that when the gear 3 is locked to the housing 4, that there can be no relative rotary movement of the pinions 8 and gear 2 and, therefore, the device is equally effective for both axles and the wheels mounted thereon. However, in case of heavy service, such as when the differential is used in large trucks or tractors, I propose to provide each side gear, as 2 and 3, with a clutch mechanism similar to that shown and described, as it is advantageous to apply the same clutching mechanism to both side gears 2 and 3 so that the clutch action will be applied directly to that gear fixedly connected to the wheel having the least traction and thereby relieve the internal parts of the gearing of much of the stress otherwise occasioned by the clutching action.

Although I have shown and described the preferred embodiments of my invention, I do not wish to be limited to the exact construction shown, as various changes in the size, form and relation of the parts thereof may readily be made, without departing from the spirit of this invention, as set forth in the appended claims.

I claim:

1. In a differential mechanism, a driving element, a driven element, a locking member interposed between said elements, and means including a pair of opposed springs associated with said member and one of the elements for causing the member and element to move in unison below a predetermined relative speed of said elements and adapted to permit relative movement of the element and member to lock the elements together and thus cause the same to move in unison when the relative movement of said elements equals or tends to exceed said predetermined relative speed.

2. In a differential mechanism, a revolvable driving element, a revolvable driven element, locking rollers interposed between said elements, and spring-actuated means associated with said rollers and one of said elements for causing the member and element to move in unison below a predetermined relative speed of said elements and adapted to permit relative movement of the element and member to lock the elements together and thus cause the same to move in unison when the relative movement of said elements equals or tends to exceed said predetermined relative speed.

3. In a differential mechanism, a revolvable driving element, a revolvable driven element, locking rollers interposed between said elements, a roller-retaining member, and resilient means associated with the member and one of said elements for causing the rollers and element to move in unison below a predetermined relative speed of said elements and adapted to permit relative movement of the elements and rollers to lock the elements together and thus cause the same to revolve in unison when the relative movement of said elements equals or tends to exceed said predetermined relative speed.

4. In a differential mechanism, a revolvable driving element, a revolvable driven element, locking rollers interposed between said elements, a roller-retaining member, and spring members connected with the retaining member and one of said elements for causing the rollers and element to move in unison below a predetermined relative speed of said elements and adapted to permit relative movement of the elements and rollers to lock the elements together and thus cause the same to revolve in unison when the relative movement of said elements equals or tends to exceed said predetermined relative speed.

5. In a differential mechanism, a revolvable driving element, a revolvable driven element, locking rollers interposed between said elements, a roller-retaining member, and spring-actuated plungers associated with the member and one of said elements for causing the rollers and element to move in unison below a predetermined relative speed of said elements and adapted to permit relative movement of the elements and rollers to lock the elements together and thus cause the same to revolve in unison when the relative movement of said elements equals or tends to exceed said predetermined relative speed.

6. In a power transmission mechanism, a driving element, a driven element, one of said elements being provided with a pair of integral spaced cam surfaces, a locking roller interposed between said elements, means associated with said roller and the element having said cam surfaces for maintaining the roller in a position intermediate said surfaces to permit free relative movement of the elements below a predetermined speed and adapted to permit the rollers to move into engagement with one or the other of the cam surfaces when the relative movement of the elements equals or tends to exceed said speed for locking the elements together and thus cause them to move in unison in one direction or the other.

7. In a power transmission mechanism, a driving element, a driven element, one of said elements being provided with a cam surface, a locking roller interposed between said elements, a roller-retaining member, and resilient means connected with said member and the element having said cam surface for maintaining the roller out of engagement with said surface to permit free relative movement of the elements below a predetermined speed and adapted to permit the roller to move into engagement with said cam surface when the relative movement of the elements equals or tends to exceed said speed for locking the elements together and thus cause them to move in unison.

8. In a power transmission mechanism, a driving element, a driven element, one of said elements being provided with a plurality of spaced cam surfaces, locking rollers interposed between said elements, a roller-retaining member adapted to space the rollers intermediate said surfaces, and resilient means connected with said member and the element having the cam surfaces adapted to maintain the rollers out of engagement with said surfaces to permit free relative movement of the elements below a predetermined speed and adapted to permit the rollers to move into engagement with respective cam surfaces when the relative movement of the elements equals or tends to exceed said speed for locking said elements together and thus cause them to rotate in unison.

9. In a differential mechanism in combination with a pair of shafts arranged in axial alignment, of a differential gearing connecting the opposing ends of the shafts, a rotatable housing for supporting said gearing, one of the gears of said differential gearing being provided with a cam surface in spaced relation with said housing, a clutch element interposed between the housing and the gear having said cam surface, and means associated with said element and the gear for yieldingly maintaining the element in spaced relation with the cam surface when the relative movement of the gear and said housing is below a predetermined relative speed and adapted to permit the element to move into engagement with said cam surface for locking the gear and housing together when said relative movement equals or tends to exceed said speed and thus cause said relative gear and housing to move in unison.

10. In a differential mechanism in combination with a pair of shafts arranged in axial alignment, of a differential gearing connecting the opposing ends of the shafts, a rotatable housing for supporting said gearing, a pair of spaced cam surfaces mounted on one of said shafts, a clutch element interposed between the housing and said cam surfaces, and means associated with the element for yieldingly maintaining the element intermediate the cam surfaces when the relative movement of the shaft and housing is below a predetermined relative speed and adapted to permit the element to move into engagement with one or the other of said cam surfaces for locking the shaft and housing together when said relative movement equals or tends to exceed said relative speed and thus cause the shaft and housing to move in unison.

11. In a differential mechanism, a driving element, a driven element, one of said elements being provided with a cam surface, rollers interposed between said cam surface and the other element, means yieldingly connecting said rollers with the element having the cam surface for maintaining the rollers and latter element in fixed predetermined relation during a comparatively slow gradual increase in relative speed of the elements and to permit relative movement of the element and rollers upon a sharp sudden increase in the speed of relative movement of the elements and thus lock said elements and rollers together to cause them to move in unison.

12. In a power transmission device, a pair of aligned driven shafts, differential mechanism therebetween comprising a driven element operatively connected with one of the shafts and a supporting member provided with a friction surface, said driven element being provided with cam surfaces arranged in spaced angular relation to said friction surface, locking rollers interposed between said surfaces, a retaining member for maintaining said rollers in spaced relation, and spring means mounted in the driven element and engaging said retaining member for yieldingly maintaining the rollers in predetermined relation with the cam surfaces.

13. In a power transmission mechanism, a driving element, a driven element, one of said elements being provided with a friction surface and the other element having cam surfaces arranged in spaced angular relation to said friction surface, locking means interposed between the friction surface and said cam surfaces for releasably locking said elements together, and means associated with the locking means and with one of said elements for yieldingly maintaining frictional contact between the locking means and said friction surface.

14. In combination, a driving element, a driven element, rolling members interposed between said elements, an annular retainer comprising a plurality of spaced openings therein for receiving the rolling members, and means associated with said retainer and one of the elements for yieldingly maintaining said element and members in fixed predetermined relation.

15. In combination, a driving element, a driven element, rolling members interposed between said elements, an annular retainer comprising a plurality of spaced openings therein for receiving the rolling members, and spring means associated with said retainer and one of the elements for yieldingly maintaining said element and members in fixed predetermined relation.

16. In combination, a driving element, a driven element, rolling members interposed between said elements, an annular retainer comprising spaced openings therein for receiving the rolling members, said retainer being provided with additional openings intermediate said first-mentioned openings, and spring means mounted in one of the elements and operatively engaging said last-mentioned openings for yieldingly maintaining said element and members in fixed predetermined relation.

17. In combination, a driving element and a driven element, one of said elements being provided with a friction surface and the other element having cam surfaces arranged in spaced angular relation to said friction surface, rolling members interposed between said surfaces, an annular retainer comprising spaced openings therein for receiving the rolling members, and means associated with said retainer and element having the cam surfaces for yieldingly maintaining said members in fixed predetermined relation with said cam surfaces.

18. In combination, a driving element and a driven element, one of said elements being provided with a friction surface and the other element having cam surfaces arranged in spaced angular relation to said friction surface, rolling members interposed between said surfaces, an annular retainer comprising spaced openings therein for receiving the rolling members, said retainer being provided with additional openings intermediate said first-mentioned openings, and spring means mounted in the element having the cam surfaces and slidably engaging in said last-mentioned openings for yieldingly maintaining said members in fixed predetermined relation with the cam surfaces.

19. In a differential mechanism, a driving element, a driven element, locking means associated with said elements mounted independently thereof in non-interlocking relation therewith and adapted to move relatively thereof to lock the elements together and thus cause them to move in unison, and means for maintaining said locking means ineffective when the relative movement of said elements is below a predetermined speed to permit a relatively slow free differential movement of the elements.

20. In a differential mechanism, a driving element, a driven element, locking means associated with said elements mounted independently thereof in non-interlocking relation therewith and adapted to move relatively thereof to lock the elements together and thus cause them to move in unison, means actuated by the relative movement of the elements when said movement reaches a predetermined relative speed for effecting said locking of the elements together.

21. In a differential mechanism, a driving element, a driven element, a locking member interposed between said elements independently of either element in non-interlocking relation therewith, and means associated with said member and one of the elements for causing the member and element to move in unison below a predetermined relative speed of said elements and adapted to permit relative movement of the element and member to lock the elements together and thus cause the same to move in unison when the relative movement of said elements equals or tends to exceed said predetermined relative speed.

22. In a differential mechanism, in combination with a pair of shafts arranged in axial alinement, of a differential gearing connecting the opposing ends of the shafts, a rotary housing for supporting said gearing, two-way clutch means having one member connected with one of said shafts and another member movable relative to the first clutch member independently of the housing adapted to admit free differential movements with one of the movable members for yieldtive speed and to lock said shaft and housing together when the relative speed of the shafts equals or tends to exceed said predetermined relative speed and thus cause the shafts to rotate in unison.

23. A device of the class described comprising in combination, a driving element, two driven elements, a differential mechanism for transmitting motion from the driving element to said driven elements, a plurality of clutch elements associated with two relatively movable members of said device, means connecting the clutch elements with one of the movable members for yieldingly maintaining the clutch elements and said movable member in fixed predetermined relation during a comparatively slow gradual increase in relative speed of the members whereby said members will freely move independently of each other and adapted to permit relative movement of the clutch elements and said movable member upon a sudden increase in the speed of relative movement of the movable members for locking said movable members together and thus cause them to move in unison.

24. In a power transmission mechanism, a driving element, a driven element, clutch means mounted intermediate said elements, said clutch means having a member freely mounted in normal non-interlocking relation with the elements for movement independently of either of said elements, spring means connected with the clutch and with one of the elements adapted to cause said clutch member and element to move in predetermined fixed relation during a comparatively slow gradual increase in relative speed of the elements and to permit relative movement of the element and clutch member upon a sharp sudden increase in the speed of relative movement of the elements and thus lock said elements and clutch means together to cause them to move in unison.

DE FOREST A. LAPHAM.